US008665876B2

(12) United States Patent
Cardona et al.

(10) Patent No.: US 8,665,876 B2
(45) Date of Patent: *Mar. 4, 2014

(54) DISTRIBUTED OVERLAY NETWORK DATA TRAFFIC MANAGEMENT BY A VIRTUAL SERVER

(75) Inventors: Omar Cardona, Cedar Park, TX (US); Vinit Jain, Austin, TX (US); Renato J. Recio, Austin, TX (US); Rakesh Sharma, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,515

(22) Filed: Jul. 27, 2012

(65) Prior Publication Data

US 2013/0034109 A1  Feb. 7, 2013

Related U.S. Application Data

(63) Continuation of application No. 13/204,260, filed on Aug. 5, 2011.

(51) Int. Cl.
  *H04L 12/28* (2006.01)
(52) U.S. Cl.
  USPC .......................................... 370/392; 370/912
(58) Field of Classification Search
  USPC ......... 370/229–231, 235, 236, 241, 248, 351, 370/389, 392, 400, 419, 431, 912, 411
  See application file for complete search history.

(56) References Cited

U.S. PATENT DOCUMENTS

| 7,702,826 | B2 | 4/2010 | Oztaskin et al. ................ 710/26 |
| 8,027,354 | B1 | 9/2011 | Portolani et al. |
| 2004/0267866 | A1 | 12/2004 | Carollo et al. ................ 709/200 |
| 2008/0117909 | A1* | 5/2008 | Johnson ........................ 370/392 |
| 2008/0148281 | A1 | 6/2008 | Magro et al. .................. 719/314 |
| 2010/0107162 | A1 | 4/2010 | Edwards et al. |
| 2010/0115101 | A1 | 5/2010 | Lain et al. |
| 2010/0131636 | A1 | 5/2010 | Suri et al. ...................... 709/224 |
| 2010/0257263 | A1 | 10/2010 | Casado et al. ................. 709/223 |
| 2011/0103259 | A1 | 5/2011 | Aybay et al. |
| 2011/0119423 | A1 | 5/2011 | Kishore et al. |
| 2011/0170550 | A1 | 7/2011 | Takashima |
| 2011/0255538 | A1 | 10/2011 | Srinivasan et al. |
| 2011/0299537 | A1 | 12/2011 | Saraiya et al. |
| 2012/0005521 | A1* | 1/2012 | Droux et al. .................. 714/4.11 |
| 2012/0023546 | A1 | 1/2012 | Kartha et al. |

(Continued)

OTHER PUBLICATIONS

"Virtual Machine Networking: Standards and Solutions," Cisco White Paper, Cisco, 2011, 10 pages.

(Continued)

*Primary Examiner* — Omar Ghowrwal
(74) *Attorney, Agent, or Firm* — VanLeeuwen & VanLeeuwen; Matthew W. Baca

(57) ABSTRACT

An approach is provided in which a data traffic module executing on a network interface card receives a data packet initiated by a first virtual machine with a destination at a second virtual machine. The data traffic module identifies one or more physical path translations corresponding to a logical connectivity that is independent of physical topology constraints of a physical network. In turn, the data traffic module encapsulates the data packet with the one or more physical path translations and sends the encapsulated data packet to the second virtual machine over the physical network.

8 Claims, 12 Drawing Sheets

(56) References Cited

U.S. PATENT DOCUMENTS

2012/0042054 A1    2/2012    Kotha et al.
2012/0069770 A1    3/2012    Hiscock
2012/0207174 A1*    8/2012    Shieh .......................... 370/401

OTHER PUBLICATIONS

"Junos Space Virtual Control," Juniper Networks, Inc., Mar. 2011, 6 pages.

"I/O Virtualization Using Mellanox InfiniBand and Channel I/O Virtualization (CIOV) Technology," Mellanox Technologies, Inc., 2007, pp. 1-16.

Office Action for U.S. Appl. No. 13/204,211 (Cardona et al., "Virtual Switch Data Control in a Distributed Overlay Network," filed Aug. 5, 2011), U.S. Patent and Trademark Office, mailed Apr. 12, 2013, 23 pages.

* cited by examiner

DISTRIBUTED OVERLAY NETWORK DATA TRAFFIC MANAGEMENT BY A VIRTUAL SERVER

RELATED APPLICATION

This application is a continuation of U.S. application Ser. No. 13/204,260, filed Aug. 5, 2011, titled "Distributed Overlay Network Data Traffic Management by a Virtual Server," and having the same inventors as the above-referenced application.

BACKGROUND

The present disclosure relates to a virtual server managing distributed overlay network data traffic. More particularly, the present disclosure relates to a data traffic module executing within a virtual switch that directs data packets to/from virtual machines according to distributed overlay network policies.

Physical networks include switches and routers that transport data between host computing systems, storage locations, and other computing entities. Virtualization technology enables system administrators to shift physical resources into a "virtual" domain, which includes virtual networks, virtual machines, and virtual switches. The virtual networks are defined at the OSI model layer 2 level (data-link layer) and, as a result, the virtual networks are constrained by the physical network's topology (e.g., router placement). In addition, a host computer system typically uses a hypervisor to instantiate and manage the virtual switch. As a result, the virtual switch is tightly coupled to platform dependencies of the hypervisor.

BRIEF SUMMARY

According to one embodiment of the present disclosure, an approach is provided in which a data traffic module executing on a network interface card receives a data packet initiated by a first virtual machine with a destination at a second virtual machine. The data traffic module identifies one or more physical path translations corresponding to a logical connectivity that is independent of physical topology constraints of a physical network. In turn, the data traffic module encapsulates the data packet with the one or more physical path translations and sends the encapsulated data packet to the second virtual machine over the physical network.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
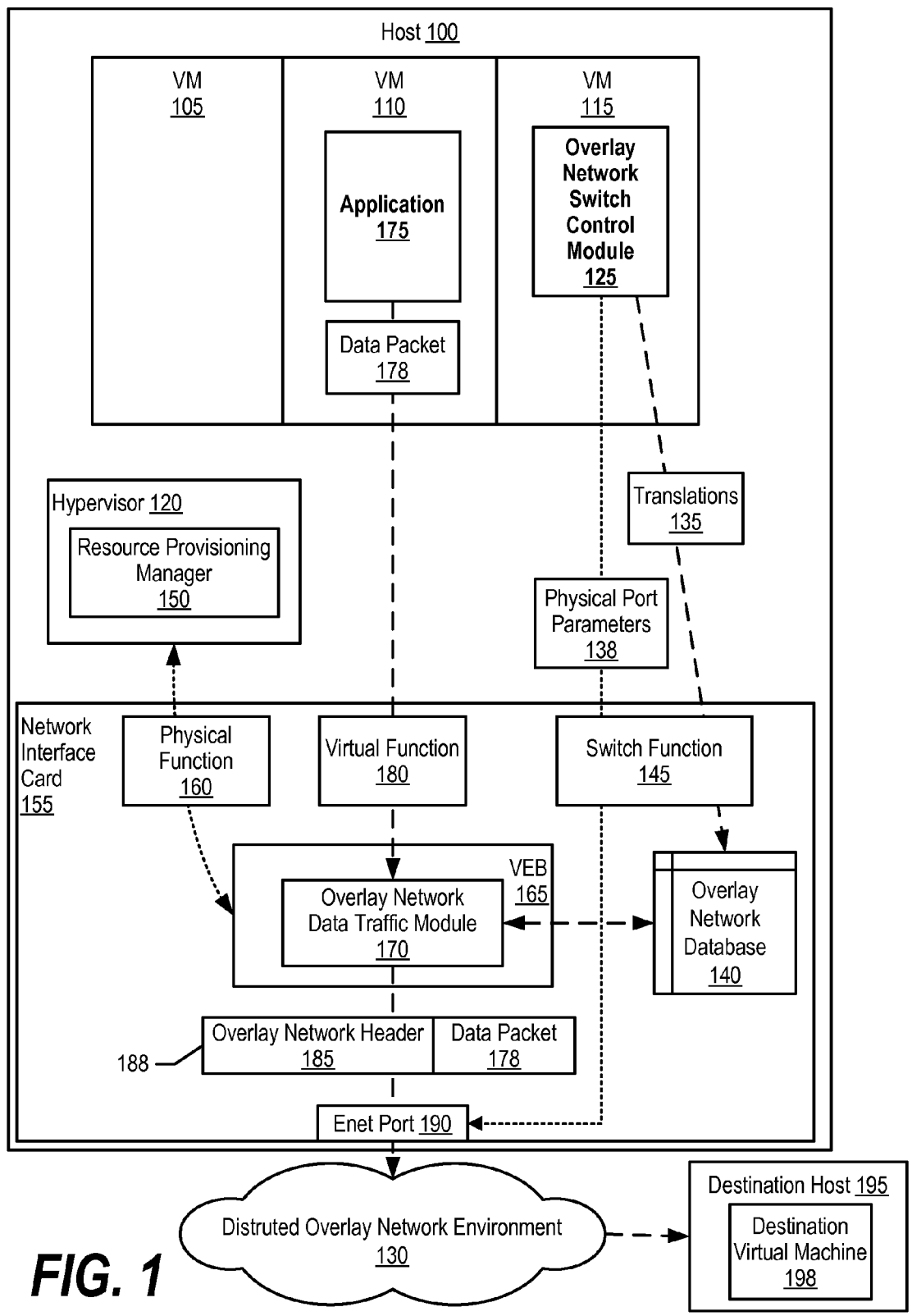
FIG. 1 is a diagram showing a host system sending an encapsulated data packet from a source virtual machine to a destination virtual machine over a distributed overlay network environment.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

FIG. 1 is a diagram showing a host system sending an encapsulated data packet from a source virtual machine to a destination virtual machine over a distributed overlay network environment (DOVE). Distributed overlay network environment 130 includes one or more virtual networks, each having their own unique overlay network identifier, which allows the virtual networks to operate concurrently over one or more physical networks. The virtual networks are logically overlayed onto the physical networks using logical policies that describe encapsulated data packet traversal between a source virtual machine and a destination virtual machine. As such, the virtual networks are independent of physical topology constraints of a physical network (e.g., router placements). The encapsulated data packets may traverse through multiple virtual networks, which may include traversing through physical entities such as switches, servers, and routers that comprise the physical networks.

Host 100 is an information handling system (e.g., a server), and includes hypervisor 120. Hypervisor 120 includes resource provisioning manager 150, which provisions resources within host 100, such as virtual machines 105-115, physical function 160, virtual function 180, and switch function 145. Physical function 160 is a full feature PCIe adapter that allows hypervisor 120 to create other functions on network interface card 155 (virtual function 180 and switch function 145), as well as manage virtual Ethernet bridge 165's operational state (e.g., managing errors and interrupts).

Virtual function 180 is a limited feature PCIe adapter that allows a source virtual machine (virtual machine 110) to send/receive data packets directly to/from virtual Ethernet bridge 165, thus bypassing hypervisor 120. Switch function 145 is a privileged virtual function that allows overlay network switch control module 125 to populate overlay network database 140 with physical path translations 135, as well as provide physical port parameters 138 to Ethernet port 190 in order to control the physical port.

Virtual Ethernet bridge 165 includes overlay network data traffic module 170, which receives data packet 178 from source virtual machine 110 (generated by application 175). Overlay network data traffic module 170 identifies data packet 178's corresponding destination virtual machine (destination virtual machine 198) and accesses overlay network database 140 to retrieve a destination overlay network identifier and a MAC/IP address corresponding to the destination virtual machine's corresponding physical server (destination host 195).

Figure 6:
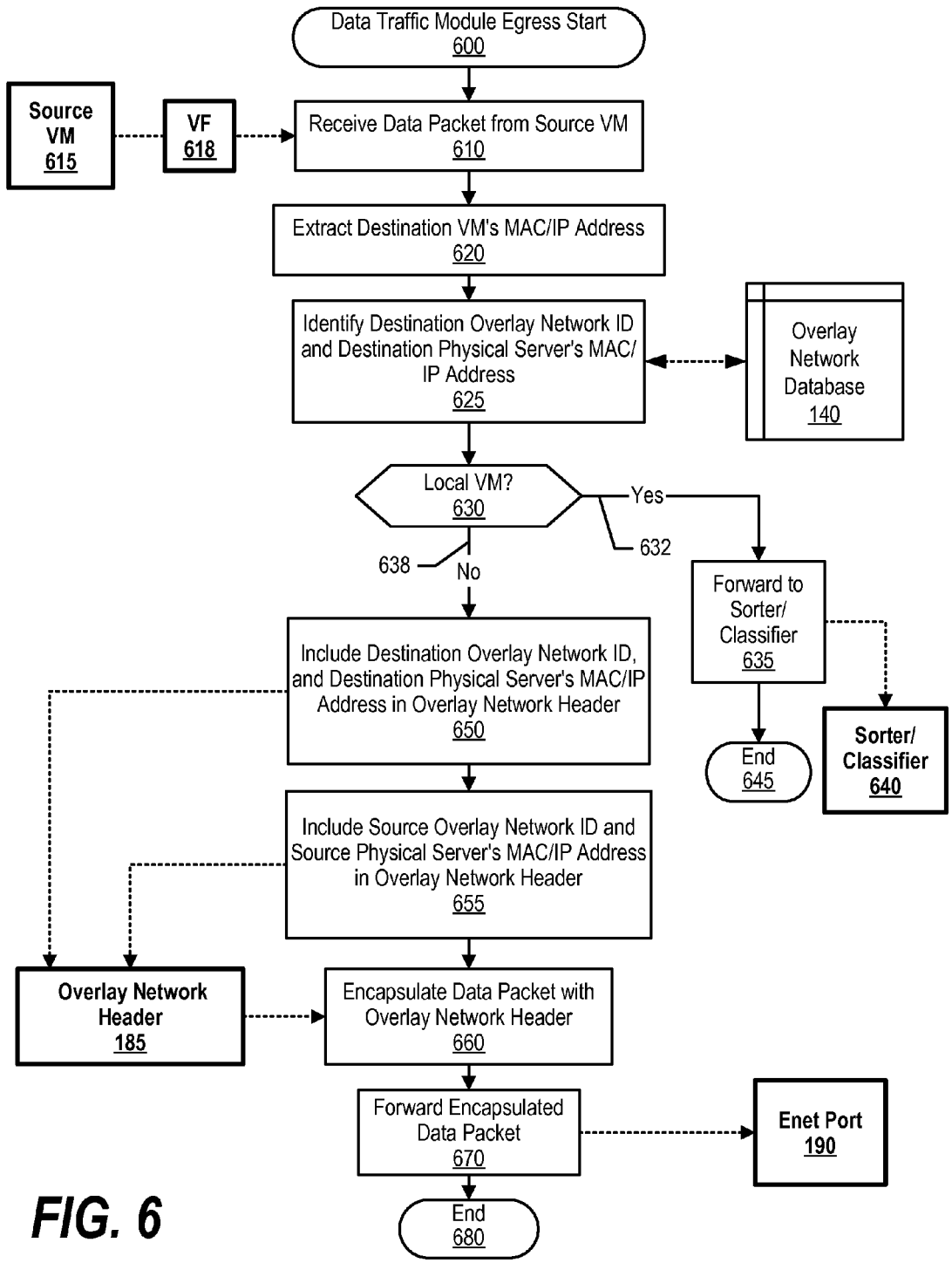
FIG. 6 is a flowchart showing steps taken in an overlay network data traffic module receiving an egress data packet directly from a virtual machine and encapsulating the data packet in line with an overlay network header.
Figure 7:
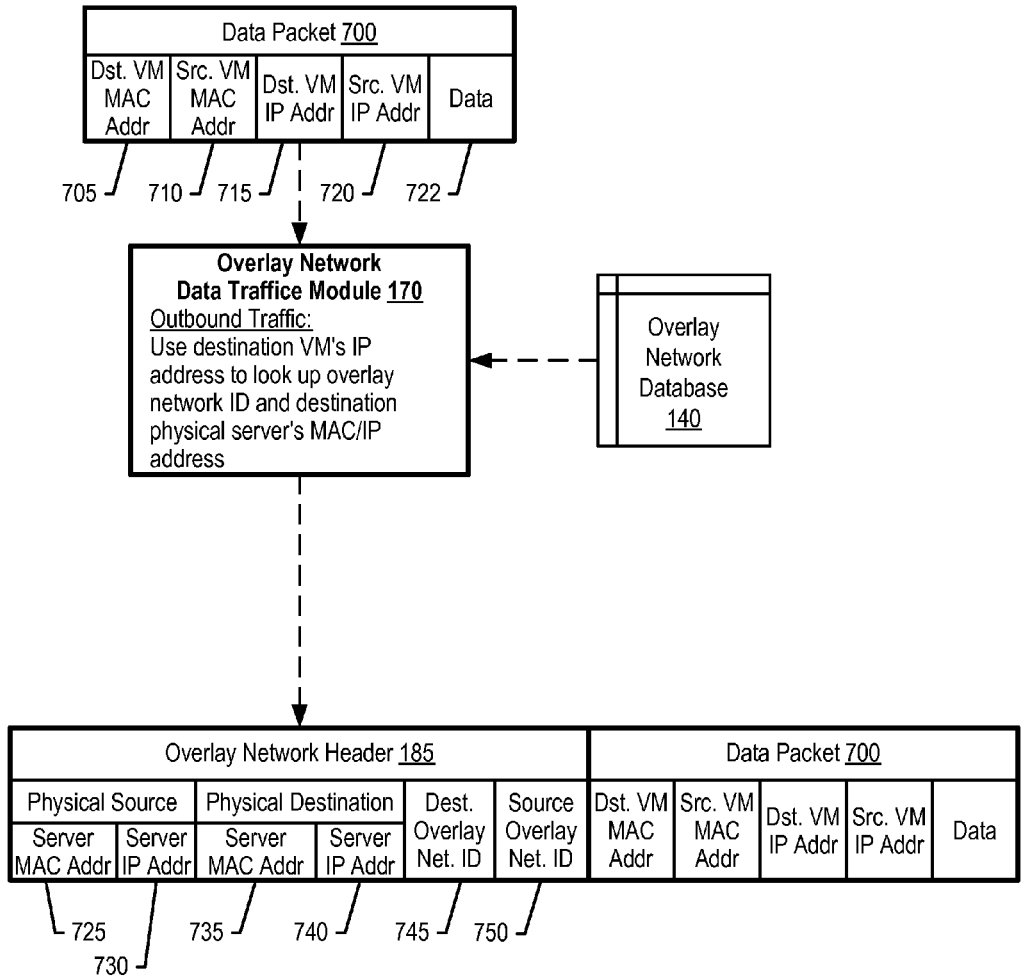
FIG. 7 is a diagram showing an overlay network data traffic module receiving a data packet and encapsulating the data packet with an overlay network header.

In turn, overlay network data traffic module 170 includes the destination information and source information corresponding to source virtual machine 110 in overlay network header 185 (see FIGS. 6-7 and corresponding text for further details). Next, overlay network data traffic module 170 encapsulates data packet 178 with overlay network header 185 and sends the encapsulated data packet over distributed overlay network environment 130 through Ethernet port 190. Destination host 195 also includes an overlay network data traffic module, which decapsulated the encapsulated data packet and forwards the data packet to destination virtual machine 198 accordingly (see FIGS. 8-9 and corresponding text for further details).

In one embodiment, overlay network data traffic module 170 may determine that the destination virtual machine is managed by the same virtual Ethernet bridge 170 (e.g., virtual machine 105). In this embodiment, overlay network data traffic module 170 may not encapsulate the data, but instead send data packet 178 directly to the destination virtual machine via the destination virtual machine's corresponding virtual function (see FIG. 6 and corresponding text for further details).

In another embodiment, overlay network data traffic module 170 may determine that data packet 178 requires encryption by a local encryption module prior to being encapsulated. In this embodiment, overlay network data traffic module 170 sends data packet 178 directly to the security module for encryption. In turn, overlay network data traffic module 170 receives an encrypted data packet from the security module, which overlay network data traffic module 170 encapsulates and sends over distributed overlay network environment 130 (see FIG. 10 and corresponding text for further details).

In yet another embodiment, overlay network data traffic module 170 may receive control and routing information from a switch control module executing on hypervisor 120. In this embodiment, hypervisor 120 provides the control and routing information through physical function 160.

Figure 2:
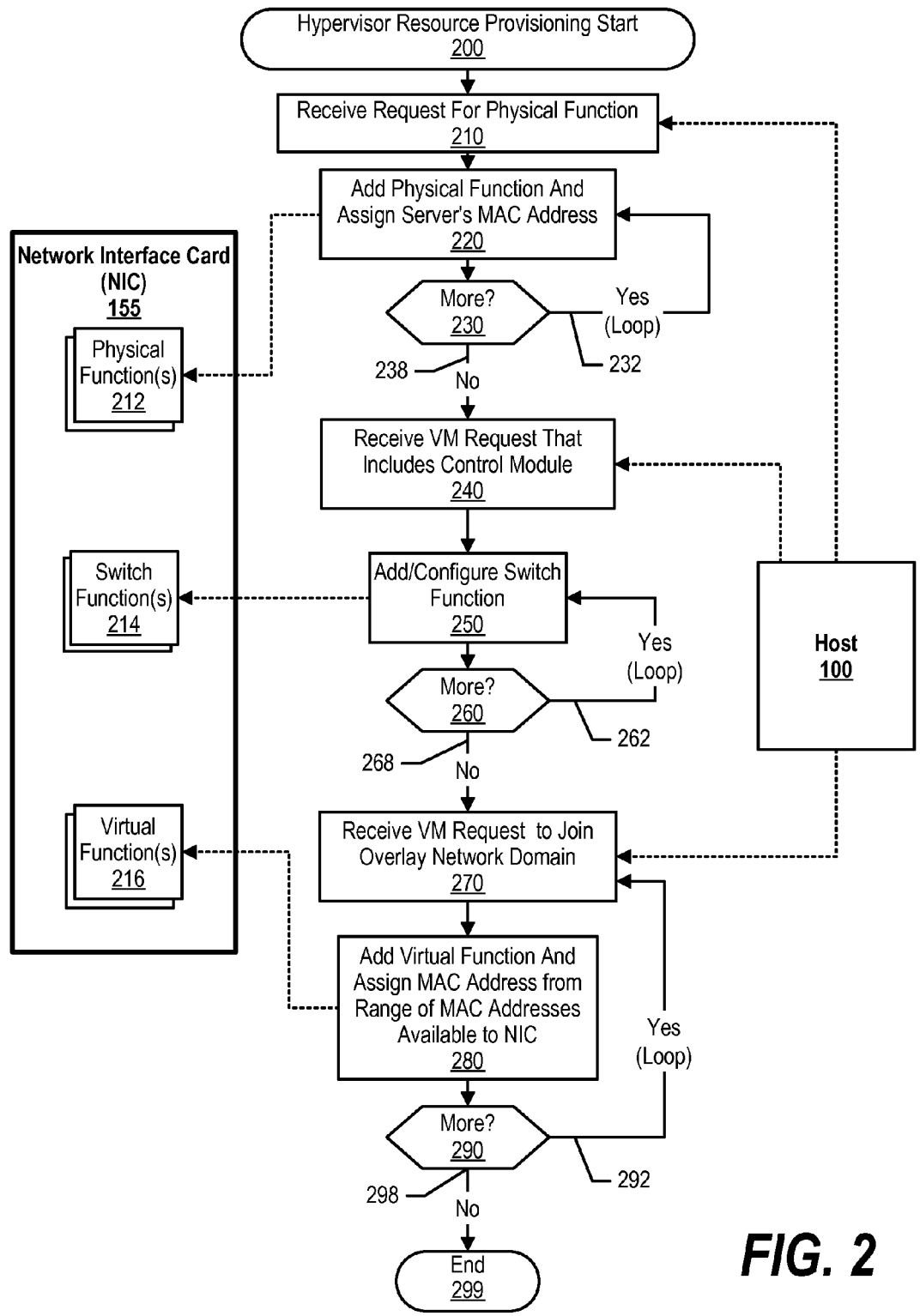
FIG. 2 is a flowchart showing steps taken in a hypervisor provisioning physical functions, switch functions, and virtual functions on a network interface card.

FIG. 2 is a flowchart showing steps taken in a hypervisor provisioning physical functions, switch functions, and virtual functions on a network interface card. Hypervisor processing commences at 200, whereupon the hypervisor receives a request from host 100 to create a physical function corresponding to a virtual Ethernet bridge (VEB) on network interface card 155 (step 210). For example, an administrator may wish to activate a particular stack on the VEB, such as a stack for a new DOVE domain.

At step 220, the hypervisor creates a physical function (one of physical functions 212) on network interface card 155. In one embodiment, the hypervisor configures the physical function per SR-IOV (single root I/O virtualization) guidelines and assigns the server's MAC address to the physical function. A determination is made as to whether there are more physical function requests, either for the same virtual Ethernet bridge (e.g., for different stacks) or for a different virtual Ethernet bridge on network interface card 115 (decision 230). If there are more requests, decision 230 branches to "Yes" branch 232, which loops back to instantiate and configure more of physical functions 220 This looping continues until there are no more requests for a physical function, at which point decision 230 branches to "No" branch 238.

At step 240, the hypervisor receives a request from host 100 for a switch control module. This request corresponds to a virtual machine that includes an overlay network switch control module, such as overlay network switch control module 125 shown in FIG. 1. In turn, the hypervisor, at step 250, instantiates and configures one of switch functions 214 on network interface card 155. In one embodiment, the hypervisor configures the switch function per SR-IOV guidelines and assigns a MAC address from a range of MAC address that are available to network interface card 155. This MAC address is also assigned to the requesting virtual machine. The switch function, in one embodiment, is a privileged virtual function that includes a port management field. The port management field enables the overlay network switch control module to send physical port parameters (e.g., MTU size, enable port mirroring, etc.) to network interface card 155, thus controlling the physical port. In addition, the port management field enables the overlay network switch control module to populate an overlay network database with physical path translations that correspond to overlay network policies (e.g., overlay network database 140 shown in FIG. 1).

A determination is made as to whether there are more requests for switch functions from host 100 (decision 260). In one embodiment, a switch control module exists for each overlay network data traffic module executing on network interface card 155. In another embodiment, a single switch control module exists for each virtual Ethernet bridge and a single virtual Ethernet bridge exists for each physical port.

If there are more requests for switch functions, decision 260 branches to "Yes" branch 262, which loops back to instantiate and configure more of switch functions 214. This looping continues until the hypervisor is through instantiating and configuring switch functions 214, at which point decision 260 branches to "No" branch 268

Next, the hypervisor receives a request from the administrator to join a virtual machine to the overlay network domain (step 270). As such, at step 280, the hypervisor creates a virtual function (one of virtual functions 216) on network interface card 155. In one embodiment, the hypervisor configures the virtual function per SR-IOV guidelines and assigns a MAC address from a range of MAC address that are available to network interface card 155. This same MAC address is assigned to the requesting virtual machine.

A determination is made as to whether there are more virtual machines requesting to join the overlay network domain (decision 290). If more virtual machines wish to join, decision 290 branches to "Yes" branch 292, which loops back to instantiate and configure more of virtual functions 216. This looping continues until the hypervisor is through instantiating and configuring virtual functions 216 for requesting virtual machines, at which point decision 290 branches to "No" branch 298 whereupon hypervisor resource provisioning ends at 299. As those skilled in the art can appreciate, the hypervisor may dynamically provision resources (adding resources and removing resources) during host 100's operation.

Figure 3:
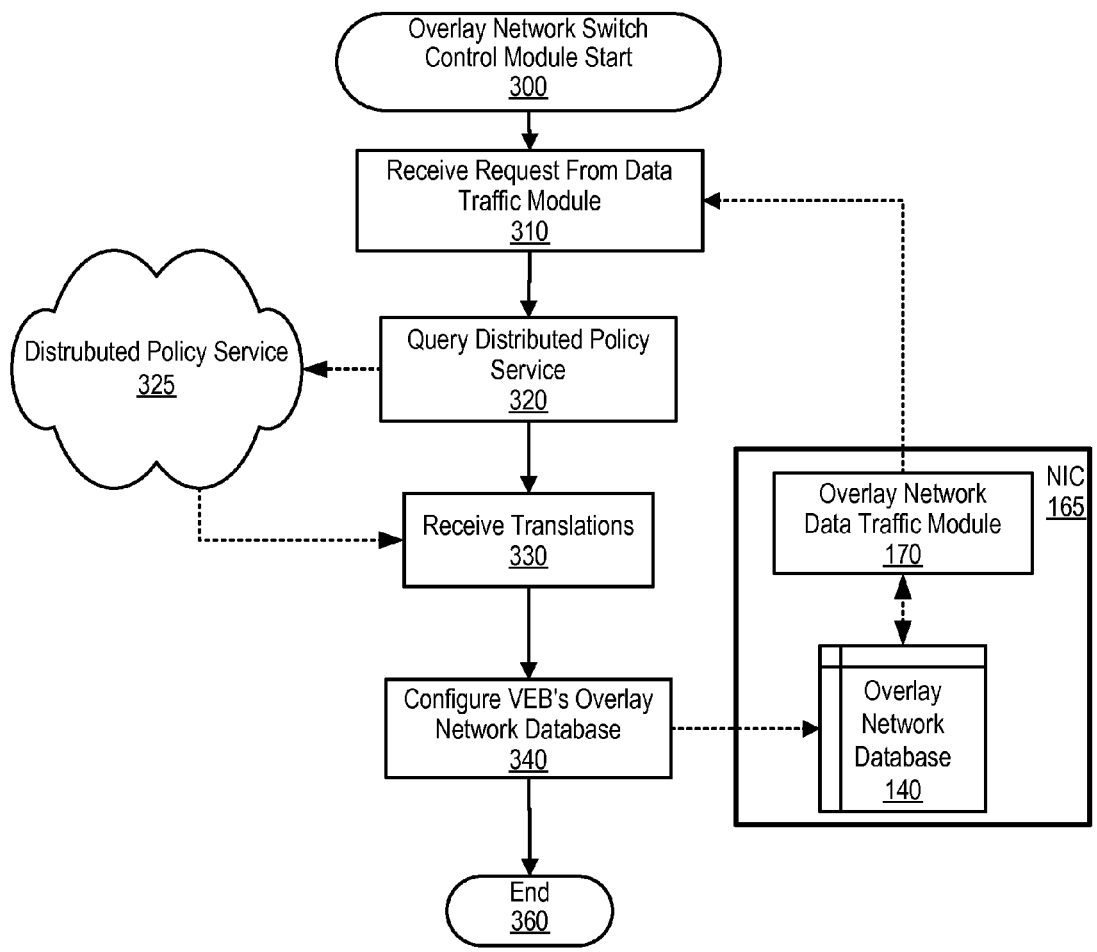
FIG. 3 is a flowchart showing steps taken by an overlay network switch control module to populate an overlay network database.

FIG. 3 is a flowchart showing steps taken by an overlay network switch control module to populate an overlay network database. Overlay network switch control module processing commences at 300, whereupon the overlay network switch control module receives a request from overlay network data traffic module 170 for physical path translation information corresponding to a particular virtual machine (or for local virtual function information whose corresponding virtual machine executes on the same host). The particular virtual machine may be a new source virtual machine that wishes to send data packets through overlay network data traffic module 170. Or, the particular virtual machine may be a destination virtual machine to which a source virtual machine is sending data packets.

In one embodiment, the overlay network switch control module receives a request to populate overlay network database 140 when a new virtual machine is instantiated (as opposed to waiting until the virtual machine sends data packets to overlay network data traffic module 170). In another embodiment, the overlay network switch control module receives a request that pertains to a local virtual machine, in which case the overlay network switch control module populates overlay network database 140 with a corresponding IP address and virtual function.

At step 320, the overlay network switch control module queries distributed policy service 325, which is a policy service that manages physical path translations based upon logical policies for virtual networks included in distributed overlay network environment 130. The switch control module receives the physical path translations at step 330, and populates overlay network database 140 with the physical path translations at step 340. In turn, overlay network data traffic module 140 accesses overlay network database 140 for the physical path translations and processes the data packets accordingly. Switch control module processing ends at 360.

In one embodiment, an administrator provides the overlay network switch control module with an overlay network identifier to assign to the particular virtual machine. In this embodiment, the overlay network switch control module includes the overlay network identifier in the overlay network database.

Figure 4:
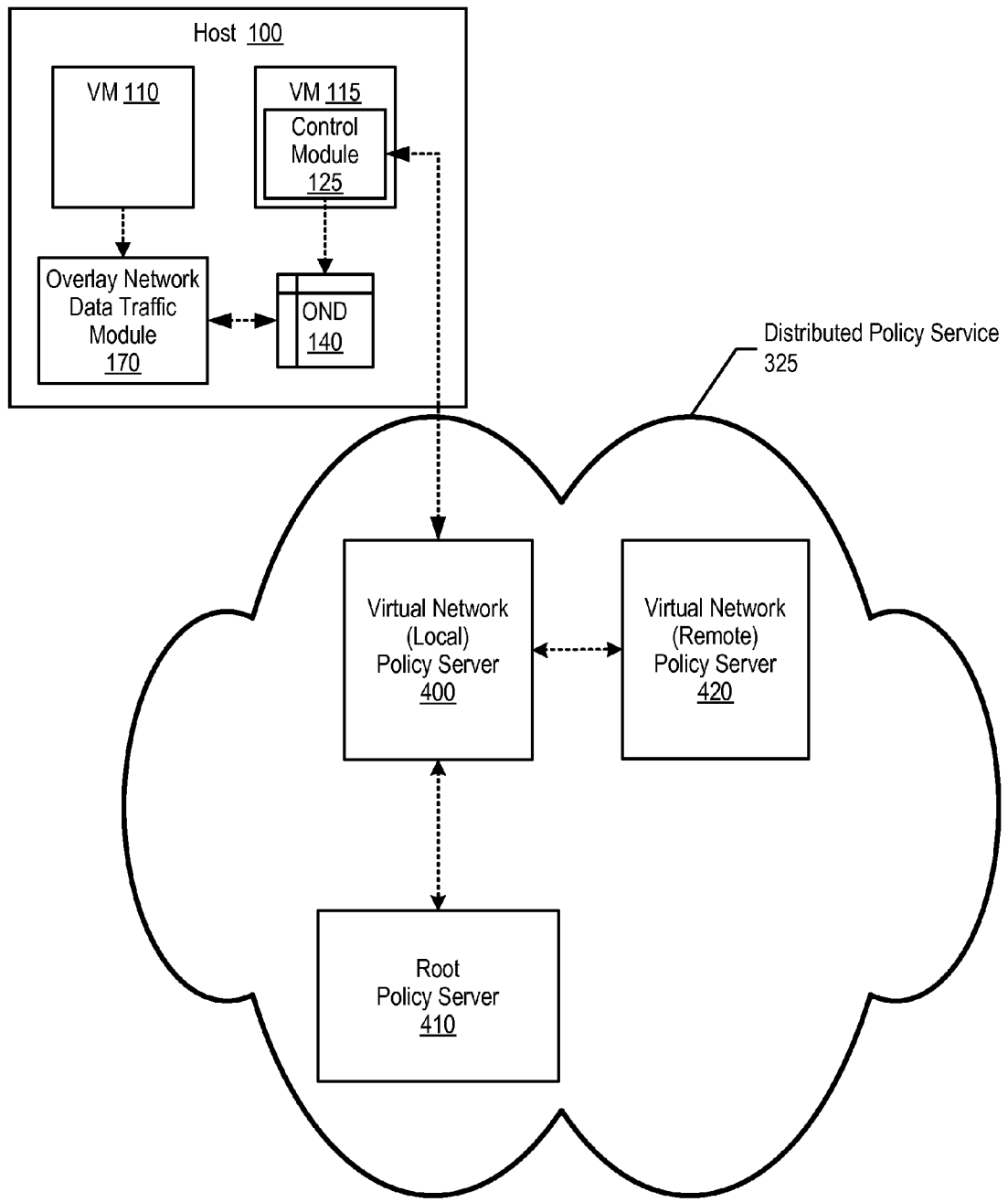
FIG. 4 is a diagram showing an overlay network switch control module querying a distributed policy service for physical path translations corresponding to a particular virtual machine.

FIG. 4 is a diagram showing an overlay network switch control module querying a distributed policy service for physical path translations corresponding to a particular virtual machine. Host 100 includes overlay network switch control module 125 executing on virtual machine 115.

Overlay network switch control module 125 queries virtual network policy server 400, which is a local policy server that manages policies and physical path translations pertaining to virtual machine 110's virtual network. In one embodiment, policy servers for different virtual networks are co-located and differentiate policy requests from different switch control modules according to their corresponding overlay network identifier.

Distributed policy service 325 is structured hierarchally and, when virtual network policy server 400 does not include a corresponding physical path translation, virtual network policy server 400 queries root policy server 410 for the policy or physical path translation. In turn, root policy server 410 may send either the physical path translation to virtual network policy server 400 or an indication as to another server to query for the physical path translation (e.g., virtual network policy server 420's ID). If the later occurs, virtual network policy server 400 queries virtual network policy server 420 for the physical path translation.

Once virtual network policy server 400 acquires the physical path translation, virtual network policy server 400 sends the physical path translation to overlay network switch control module 125, which it stores in overlay network database 140 for overlay network data traffic module 170 to access.

Figure 5:
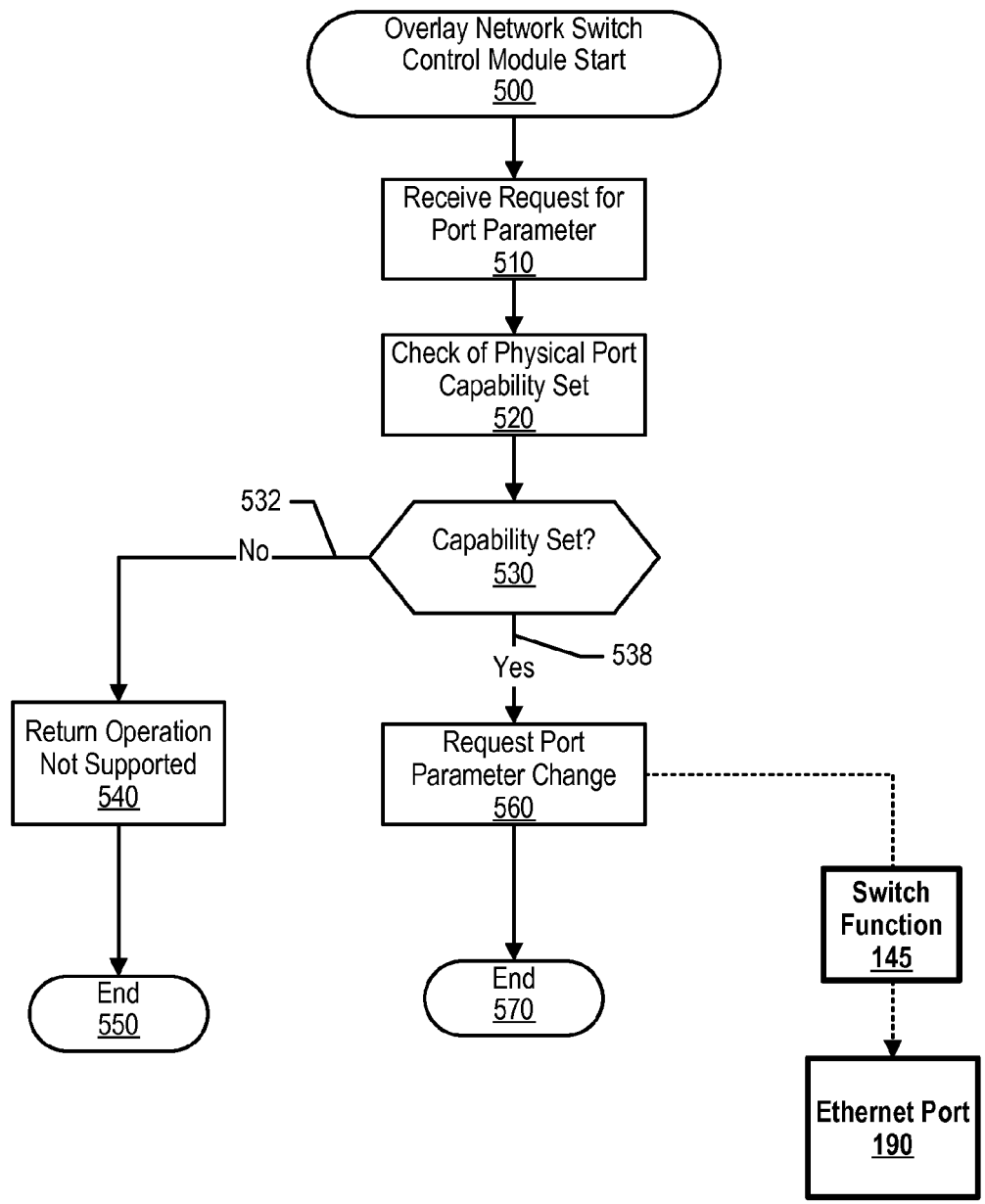
FIG. 5 is a flowchart showing steps taken in an overlay network switch control module sending physical port parameters to a physical port in order to control the physical port.

FIG. 5 is a flowchart showing steps taken in an overlay network switch control module sending physical port parameters to a physical port in order to control the physical port. Overlay network switch control module processing commences at 500, whereupon the overlay network switch control module receives a request for a port parameter from a requesting entity, such as from a device or virtual function (step 510).

At step 520, the overlay network switch control module checks Ethernet port 190's capability set, such as Ethernet port 190's maximum transmission unit (MTU) size, port mirroring capabilities, etc. The overlay network switch control module determines whether Ethernet port 190 supports the corresponding capability of the requested port parameter (decision 530). If Ethernet port 190 does not support the corresponding capability, decision 530 branches to "No" branch 532, whereupon the overlay network switch control module returns a not supported message back to the requesting entity (step 540), and processing ends at 550.

On the other hand, if Ethernet port 190 supports the corresponding capability, decision 530 branches to "Yes" branch 538, whereupon the overlay network switch control module sends a request for the port parameter change to Ethernet port 190 through switch function 145 (step 560). As discussed herein, switch function 145 may be a privileged virtual function that includes a port management field. Switch function 145's port management field allows the overlay network switch control module to send the physical port parameters (e.g., MTU size, enable port mirroring, etc.) and, in turn, control Ethernet port 190. Overlay network switch control module processing ends at 570.

FIG. 6 is a flowchart showing steps taken in an overlay network data traffic module receiving an egress data packet directly from a virtual machine and encapsulating the data packet in line with an overlay network header. Overlay network data traffic module processing commences at 600, whereupon the overlay network data traffic module receives a data packet from source virtual machine 615 through virtual function 618 (step 610). As discussed herein, virtual machines send/receive data to/from the overlay network data traffic module directly through virtual functions, thus bypassing hypervisor involvement. At step 620, the overlay network data traffic module extracts the destination virtual machine's MAC/IP address from the data packet.

Next, at step 625, the overlay network data traffic module accesses overlay network database 140, and identifies a destination overlay network identifier and a physical host address that corresponds to the destination virtual machine's IP address. The destination overlay network identifier indicates a virtual network corresponding to the destination virtual machine (e.g., virtual network "4") and the physical host address is the MAC and IP address of the server that executes the virtual machine.

A determination is made as to whether the destination virtual machine is managed by the same data traffic module (e.g., a "local" virtual machine, decision 630). If so, the data traffic module is not required to encapsulate the data packet, and decision 630 branches to "Yes" branch 632. At step 635, the overlay network data traffic module sends the data packet (not encapsulated) to sorter/classifier 640 (included in virtual Ethernet bridge 165). In turn, sorter/classifier 640 forwards the data packet directly to the destination virtual machine through the identified virtual function, thus bypassing the hypervisor. Processing ends at 645.

On the other hand, if the destination virtual machine is not a local virtual machine, decision 630 branches to "No" branch 638, whereupon the overlay network data traffic module includes the destination overlay network identifier, the destination physical server's MAC/IP address in overlay network header 185 (step 650, see FIG. 7 and corresponding text for further details).

The data traffic module, at step 655, includes information pertaining to source virtual machine 615 into overlay network header 185, such as the source overlay network identifier and the source's physical server's MAC/IP address. As those skilled in the art can appreciate, steps 650 and 655 may be performed at the same time or separated into steps different than that shown in FIG. 6.

In turn, the overlay network data traffic module encapsulates the data packet with overlay network header 185 (step 660). At step 670, the data traffic module sends the encapsulated data packet to the destination virtual machine through Ethernet port 190 over the distributed overlay network environment. In one embodiment, the encapsulated data packet traverses over multiple virtual networks, such as source virtual machine 615's virtual network and the destination virtual machine's virtual network. Data traffic module egress processing ends at 680.

FIG. 7 is a diagram showing an overlay network data traffic module receiving a data packet and encapsulating the data packet with an overlay network header. Data packet 700 includes destination virtual machine MAC address 705, source virtual machine MAC address 710, destination virtual machine IP address 715, source virtual machine IP address 720, and data 722. In one embodiment, data packet 700 is an IP packet with appended MAC addresses 705 and 710. In another embodiment, data packet 700 may be an Ethernet frame. As those skilled in the art can appreciate, other fields may be included in data packet 700 other than what is shown in FIG. 7.

Overlay network header 185 includes fields 725-750, which include source virtual machine related information as well as destination virtual machine related information, such as the virtual machines' corresponding servers' physical address information and overlay network identifiers. Overlay network data traffic module 170 generates overlay network header 185 using information from overlay network database 140, which a switch control module populates with physical translation entries discussed herein.

Overlay network data traffic module 170 receives outbound data packet 700 and identifies destination virtual machine IP address 715. Overlay network data traffic module 170 accesses overlay network database 140 and identifies the destination virtual machine's corresponding overlay network identifier and a MAC/IP address corresponding to the host server that executes the virtual machine. In turn, overlay network data traffic module 170 includes the destination virtual machine's overlay network identifier in field 745, and includes the corresponding server's MAC and IP addresses in fields 735 and 740, respectively.

Regarding the source virtual machine's related fields, overlay network data traffic module 170 accesses overlay network database 140 to identify the source virtual machine's overlay network identifier, and includes the source virtual machine's overlay network identifier in field 750. To finish the source fields, overlay network data traffic module 170 identifies the source virtual machine's corresponding server MAC/IP addresses and includes them in fields 725 and 730, respectively.

Overlay network data traffic module 170 then encapsulates outbound data packet 700 with overlay network header 185 and sends the encapsulated data to the destination virtual machine through the distributed overlay network environment.

Figure 8:
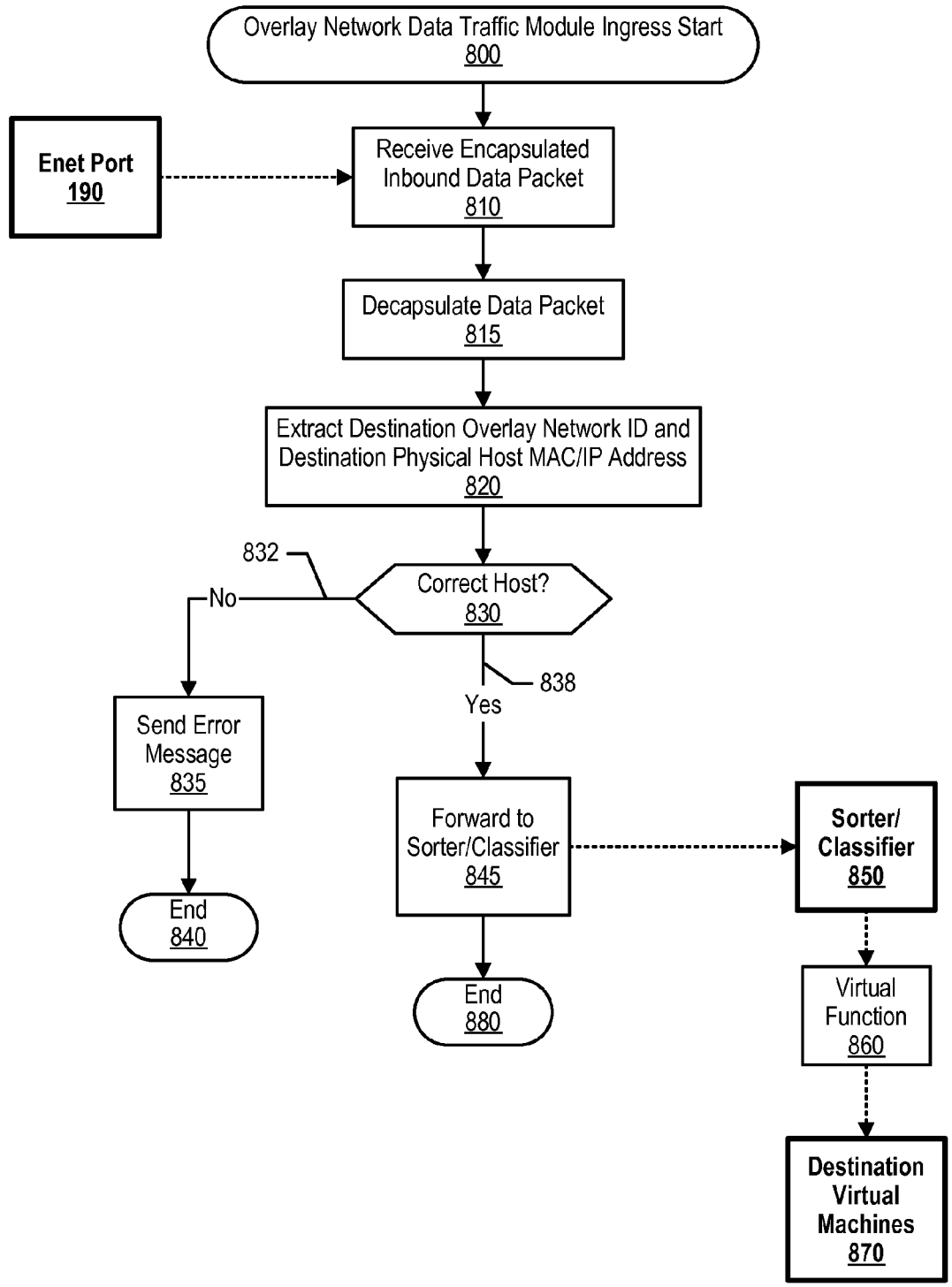
FIG. 8 is a flowchart showing steps taken in an overlay network data traffic module receiving an encapsulated inbound data packet targeted for a particular destination virtual machine.

FIG. 8 is a flowchart showing steps taken in an overlay network data traffic module receiving an encapsulated inbound data packet targeted for a particular destination virtual machine. Overlay network data traffic module processing commences at 800, whereupon the overlay network data traffic module receives an encapsulated data packet from Ethernet port 190 at step 810. At step 815, the overlay network data traffic module decapsulates the data packet, which results in an overlay network header and a data packet.

The overlay network data traffic module extracts a destination overlay network identifier and the destination physical host MAC/IP address from the overlay header at step 820. The overlay network data traffic module determines whether the data packet is at the correct host machine at decision 830. If the data packet is not at the correct host machine, decision 830 branches to "No" branch 832 whereupon the overlay network data traffic module sends an error message (e.g., to a system administrator and/or the source virtual machine) at step 835, and processing ends at 840.

On the other hand, if the data packet is at the correct host machine, decision 830 branches to "Yes" branch 838 whereupon the overlay network data traffic module forwards the data packet (without the overlay network header) to sorter/classifier 850 (included in virtual Ethernet bridge 165) at step 845. In turn, sorter/classifier 850 uses the destination virtual machine's MAC information included in the data packet to forward the data packet to destination virtual machine 870 through corresponding virtual function 860. Overlay network data traffic module processing ends at 880.

Figure 9:
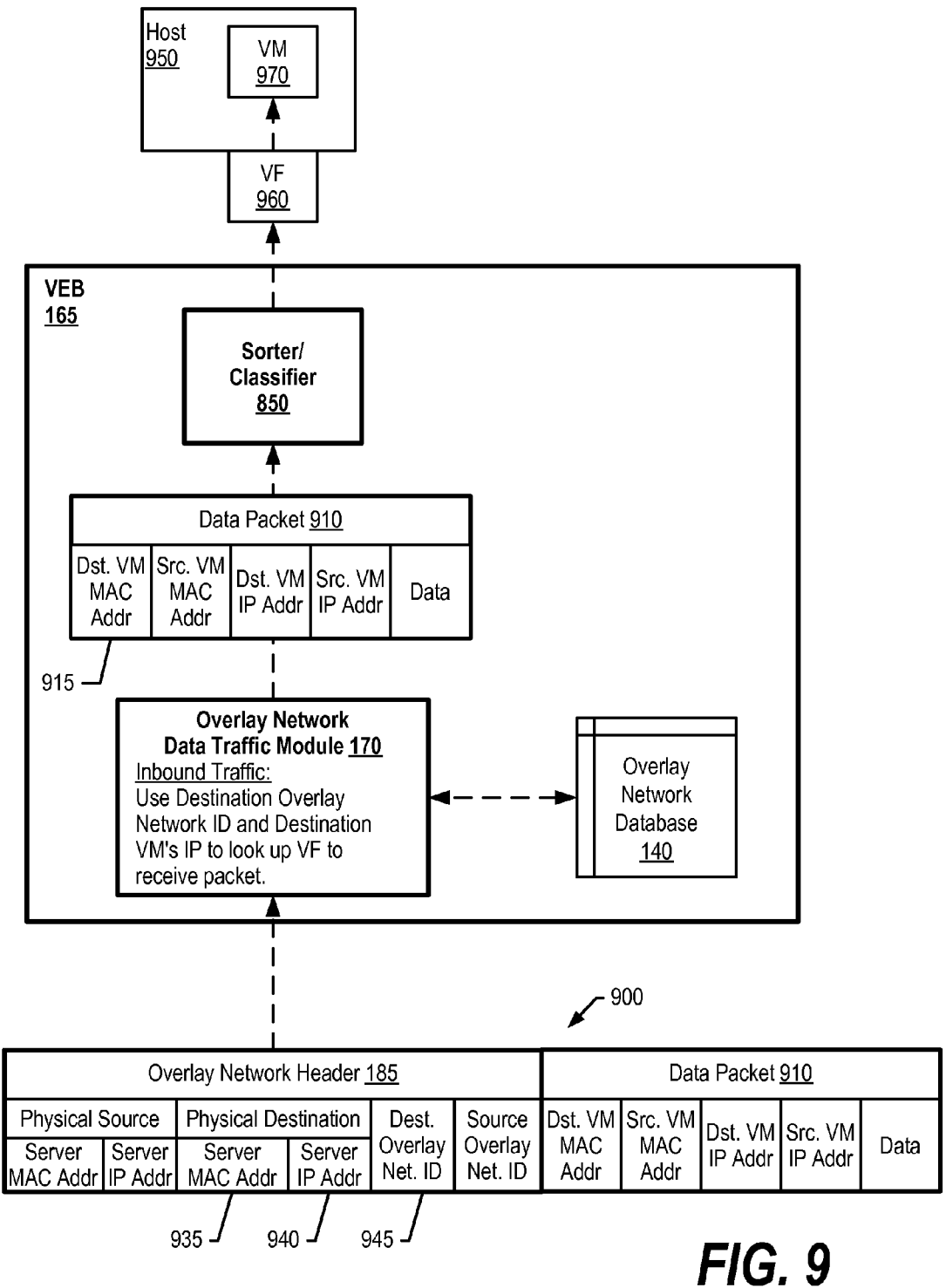
FIG. 9 is a diagram showing an overlay network data traffic module receiving an encapsulated data packet and sending the data packet directly to a destination virtual machine through a virtual function.

FIG. 9 is a diagram showing an overlay network data traffic module receiving an encapsulated data packet and forwarding the data packet to a sorter/classifier that sends the data packet directly to a destination virtual machine via a virtual function.

Overlay network data traffic module 170 receives encapsulated data packet 900, which includes overlay network header 185 and data packet 910. Overlay network data traffic module 170 extracts the destination overlay network identifier from field 945, as well as the destination physical host's MAC/IP address from fields 935 and 940, respectively. In turn, overlay network data traffic module 170 uses overlay network database 140 to verify encapsulated data packet 900 is destined for host 950.

If data packet 900 is destined for host 950, overlay network data traffic module 170 forwards data packet 910 to sorter/classifier 850, which uses destination virtual machine MAC address 915 to identify destination virtual machine 970 and send data packet 910 to destination virtual machine 970 through virtual function 960 (bypassing the hypervisor).

Figure 10:
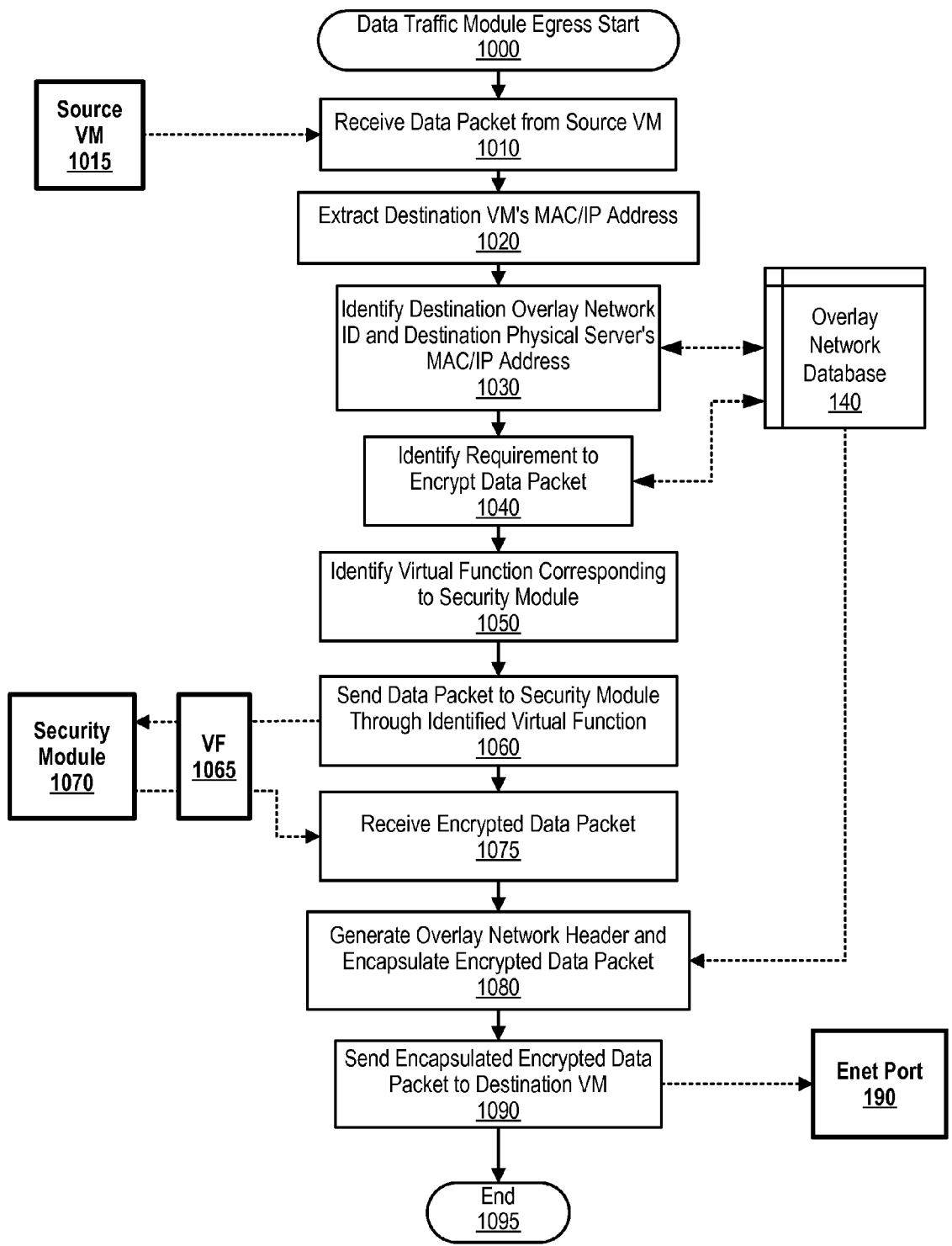
FIG. 10 is a flowchart showing steps taken in an overlay network data traffic module encrypting data packets prior to encapsulation.

FIG. 10 is a flowchart showing steps taken in an overlay network data traffic module encrypting data packets prior to encapsulation. At times, the overlay network data traffic module may be required to have data packets encrypted before encapsulating them with an overlay network header. In one embodiment, the requirement may be related to a particular source virtual machine or a particular destination virtual machine. In another embodiment the requirement may be a global requirement to encrypt all data packets coming from any source virtual machine.

Overlay network data traffic module processing commences at 1000, whereupon the overlay network data traffic module receives a data packet from source virtual machine 1015 at step 1010. The overlay network data traffic module extracts the destination virtual machine's MAC/IP address at step 1020, and identifies the destination overlay network ID and physical server's MAC/IP at step 1030. At step 1040, the overlay network data traffic module identifies a requirement in overlay network database 140 to encrypt the data packet.

As discussed above, the requirement may correspond to data packets sent from source virtual machine 1015 or the requirement may correspond to data packets sent to the destination virtual machine.

Next, the overlay network data traffic module identifies a virtual function (virtual function 1065) corresponding to a security module to encrypt the data (step 1050) and, at step 1060, the overlay network data traffic module sends the data packet directly to security module 1070 through virtual function 1065.

At step 1075, the overlay network data traffic module receives an encrypted data packet directly from security module 1070 through virtual function 1065. The overlay network data traffic module generates an overlay network header for the encrypted data packet and encapsulates the encrypted data packet as discussed herein (step 1080). In turn, the overlay network data traffic module sends the encapsulated encrypted data packet to the destination virtual machine through Ethernet port 190 at step 1090, and processing ends at 1095. In one embodiment, a similar approach may be used to inspect packets via a packet inspection module. In this embodiment, packets that are identified as malicious are dropped.

Figure 11:
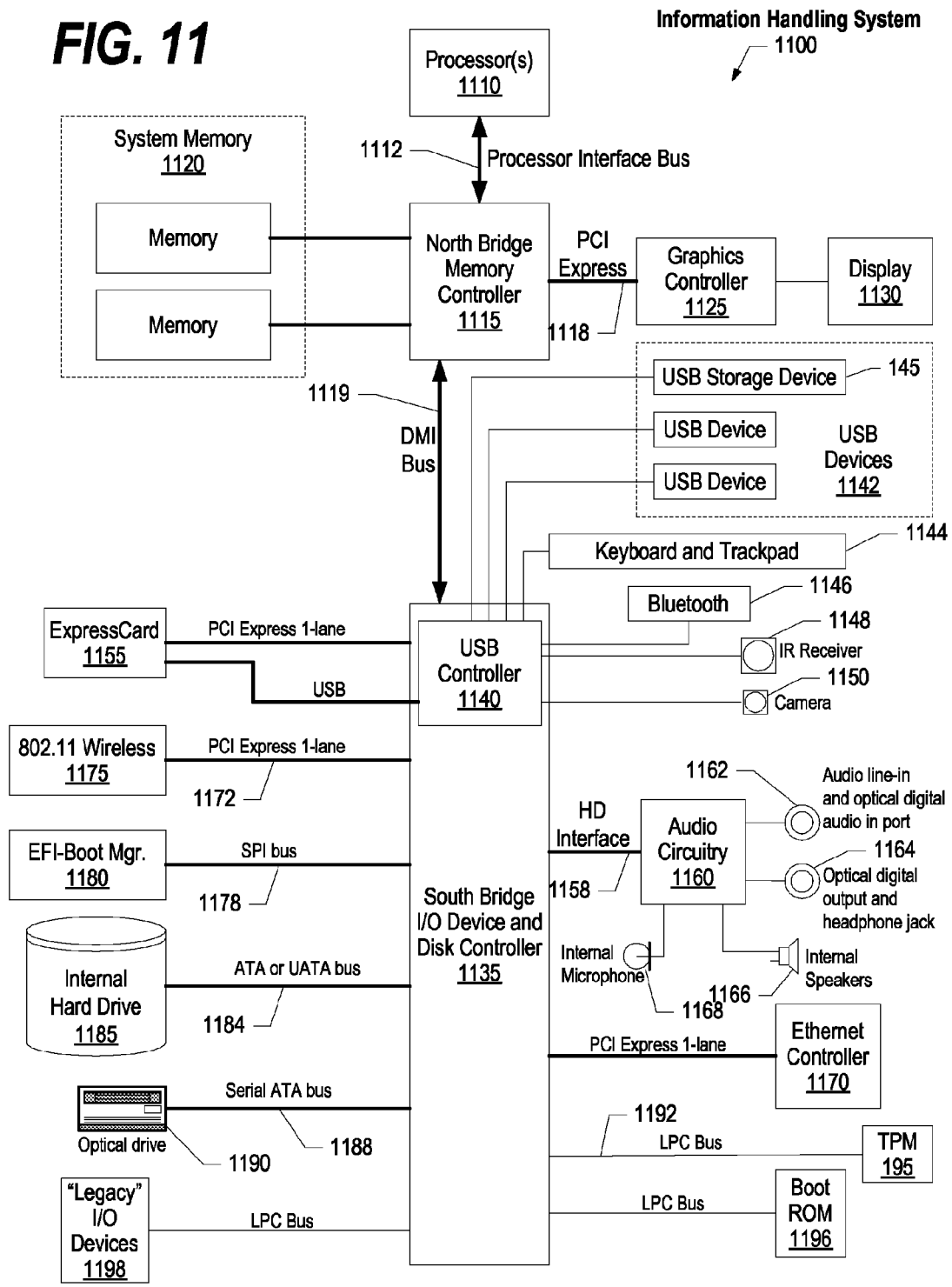
FIG. 11 is a block diagram of a data processing system in which the methods described herein can be implemented.

FIG. 11 illustrates information handling system 1100, which is a simplified example of a computer system capable of performing the computing operations described herein. Information handling system 1100 includes one or more processors 1110 coupled to processor interface bus 1112. Processor interface bus 1112 connects processors 1110 to Northbridge 1115, which is also known as the Memory Controller Hub (MCH). Northbridge 1115 connects to system memory 1120 and provides a means for processor(s) 1110 to access the system memory. Graphics controller 1125 also connects to Northbridge 1115. In one embodiment, PCI Express bus 1118 connects Northbridge 1115 to graphics controller 1125. Graphics controller 1125 connects to display device 1130, such as a computer monitor.

Northbridge 1115 and Southbridge 1135 connect to each other using bus 1119. In one embodiment, the bus is a Direct Media Interface (DMI) bus that transfers data at high speeds in each direction between Northbridge 1115 and Southbridge 1135. In another embodiment, a Peripheral Component Interconnect (PCI) bus connects the Northbridge and the Southbridge. Southbridge 1135, also known as the I/O Controller Hub (ICH) is a chip that generally implements capabilities that operate at slower speeds than the capabilities provided by the Northbridge. Southbridge 1135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1196 and "legacy" I/O devices (using a "super I/O" chip). The "legacy" I/O devices (1198) can include, for example, serial and parallel ports, keyboard, mouse, and/or a floppy disk controller. The LPC bus also connects Southbridge 1135 to Trusted Platform Module (TPM) 1195. Other components often included in Southbridge 1135 include a Direct Memory Access (DMA) controller, a Programmable Interrupt Controller (PIC), and a storage device controller, which connects Southbridge 1135 to nonvolatile storage device 1185, such as a hard disk drive, using bus 1184.

ExpressCard 1155 is a slot that connects hot-pluggable devices to the information handling system. ExpressCard 1155 supports both PCI Express and USB connectivity as it connects to Southbridge 1135 using both the Universal Serial Bus (USB) the PCI Express bus. Southbridge 1135 includes USB Controller 1140 that provides USB connectivity to devices that connect to the USB. These devices include webcam (camera) 1150, infrared (IR) receiver 1148, keyboard and trackpad 1144, and Bluetooth device 1146, which provides for wireless personal area networks (PANs). USB Controller 1140 also provides USB connectivity to other miscellaneous USB connected devices 1142, such as a mouse, removable nonvolatile storage device 1145, modems, network cards, ISDN connectors, fax, printers, USB hubs, and many other types of USB connected devices. While removable nonvolatile storage device 1145 is shown as a USB-connected device, removable nonvolatile storage device 1145 could be connected using a different interface, such as a Firewire interface, et cetera.

Wireless Local Area Network (LAN) device 1175 connects to Southbridge 1135 via the PCI or PCI Express bus 1172. LAN device 1175 typically implements one of the IEEE 802.11 standards of over-the-air modulation techniques that all use the same protocol to wireless communicate between information handling system 1100 and another computer system or device. Optical storage device 1190 connects to Southbridge 1135 using Serial ATA (SATA) bus 1188. Serial ATA adapters and devices communicate over a high-speed serial link. The Serial ATA bus also connects Southbridge 1135 to other forms of storage devices, such as hard disk drives. Audio circuitry 1160, such as a sound card, connects to Southbridge 1135 via bus 1158. Audio circuitry 1160 also provides functionality such as audio line-in and optical digital audio in port 1162, optical digital output and headphone jack 1164, internal speakers 1166, and internal microphone 1168. Ethernet controller 1170 connects to Southbridge 1135 using a bus, such as the PCI or PCI Express bus. Ethernet controller 1170 connects information handling system 1100 to a computer network, such as a Local Area Network (LAN), the Internet, and other public and private computer networks.

While FIG. 11 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 1195) shown in FIG. 11 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 12.

Figure 12:
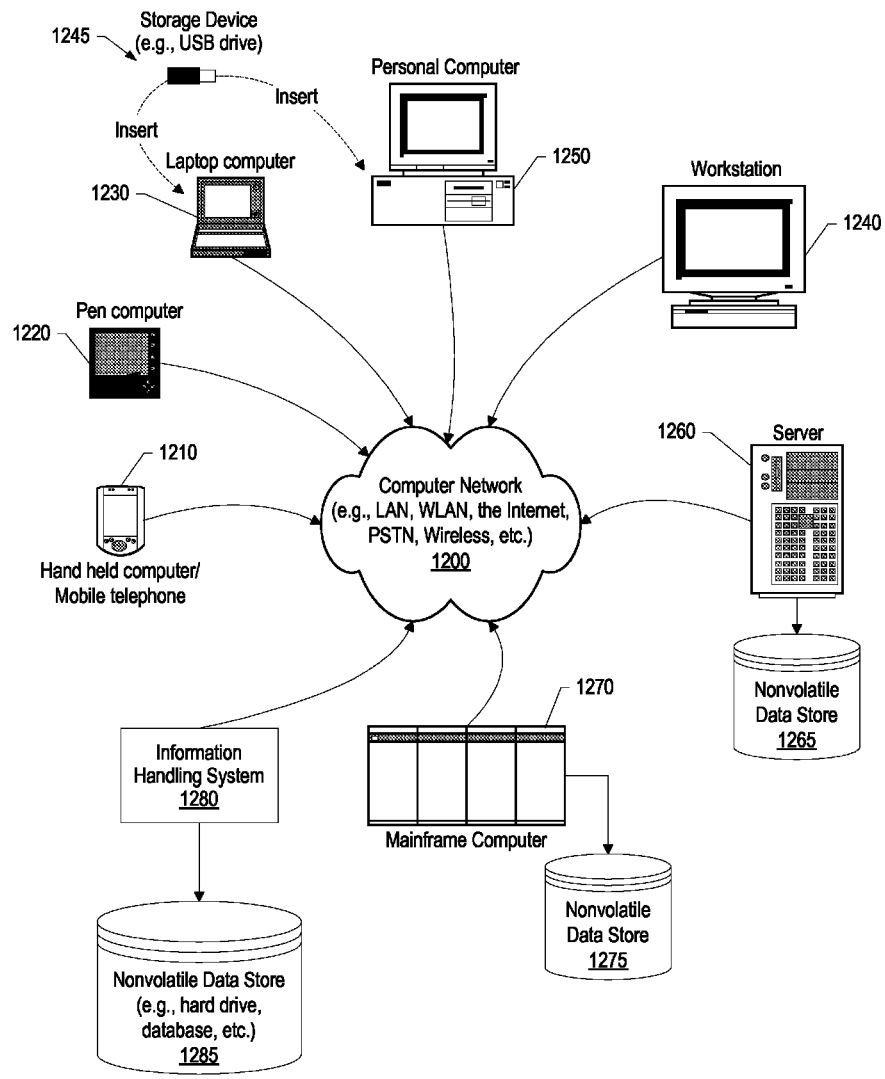
FIG. 12 provides an extension of the information handling system environment shown in FIG. 11 to illustrate that the methods described herein can be performed on a wide variety of information handling systems which operate in a networked environment.

FIG. 12 provides an extension of the information handling system environment shown in FIG. 11 to illustrate that the methods described herein can be performed on a wide variety of information handling systems that operate in a networked environment. Types of information handling systems range from small handheld devices, such as handheld computer/mobile telephone 1210 to large mainframe systems, such as mainframe computer 1270. Examples of handheld computer 1210 include personal digital assistants (PDAs), personal entertainment devices, such as MP3 players, portable televisions, and compact disc players. Other examples of information handling systems include pen, or tablet, computer 1220, laptop, or notebook, computer 1230, workstation 1240, personal computer system 1250, and server 1260. Other types of information handling systems that are not individually shown in FIG. 12 are represented by information handling system 1280. As shown, the various information handling systems can be networked together using computer network 1200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 12 depicts separate nonvolatile data stores (server 1260 utilizes nonvolatile data store 1265, mainframe computer 1270 utilizes nonvolatile data store 1275, and information handling system 1280 utilizes nonvolatile data store 1285). The nonvolatile data store can be a component that is external to the various information handling systems or can be internal to one of the information handling systems. In addition, removable nonvolatile storage device 1145 can be shared among two or more information handling systems using various techniques, such as connecting the removable nonvolatile storage device 1145 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. A method comprising:
receiving, at a data traffic module executing on a network interface card, a data packet that is initiated by a first virtual machine with a destination at a second virtual machine;
identifying one or more physical path translations that are based upon a logical connectivity between the first virtual machine and the second virtual machine over a plurality of virtual networks, wherein each of the plurality of virtual networks are defined by a data-link layer operating on a physical network;
encapsulating, by the data traffic module, the data packet with the one or more physical path translations, wherein the one or more physical path translations include a plurality of network overlay identifiers, each of the plurality of network overlay identifiers corresponding to one of the plurality of virtual networks; and
sending the encapsulated data packet from the data traffic module executing on the network interface card through a physical port included on the network interface card to the second virtual machine over the plurality of virtual networks operating on the physical network.

2. The method of claim 1 wherein a policy indicates the logical connectivity using one or more logical references and is devoid of a physical reference to a physical entity located on the physical network.

3. The method of claim 1 wherein the encapsulated data traverses through a plurality of logical subnets separated by one or more routers prior to arriving at the destination virtual machine.

4. The method of claim 1 wherein the first virtual machine sends the data packet to the data traffic module through a virtual function, the data packet bypassing a hypervisor.

5. The method of claim 1 further comprising:
extracting, from the data packet, a destination virtual machine IP address corresponding to the second virtual machine;
identifying a destination overlay network identifier and a destination physical host address that correspond to the destination virtual machine IP address, the destination overlay network identifier corresponding to one of the virtual networks;
including the destination overlay network identifier and the destination physical host address in an overlay network header; and
wherein the encapsulating includes encapsulating the data packet with the overlay network header.

6. The method of claim 1 further comprising:
receiving, at the data traffic module, an encapsulated inbound data packet;
decapsulating the encapsulated inbound data packet resulting in an overlay network header and an inbound data packet; and
forwarding the inbound data packet to a sorter/classifier, wherein the sorter/classifier sends the inbound data packet to the destination virtual machine through a corresponding virtual function, the inbound data packet bypassing a hypervisor.

7. The method of claim 1 further comprising:
receiving a subsequent data packet at the data traffic module, the subsequent data packet having a destination at a third virtual machine;
determining, by the data traffic module, that the third virtual machine is a local virtual machine; and
forwarding the subsequent data packet to a sorter/classifier, wherein the sorter/classifier sends the subsequent data packet to the third virtual machine through a corresponding virtual function without encapsulating the subsequent data packet, the subsequent data packet bypassing a hypervisor.

8. The method of claim 1 further comprising:
determining that the data packet requires encryption;
in response to determining the data packet requires encryption, prior to encapsulating the data packet, the method further comprises:
identifying a security module executing on a third virtual machine that is managed by the data traffic module;
sending the data packet to the third virtual machine through a virtual function, the data packet bypassing a hypervisor; and receiving, from the third virtual machine through the virtual function, an encrypted data packet at the data traffic module, the encrypted data packet bypassing the hypervisor; and performing the encapsulation on the encrypted data packet.

* * * * *